United States Patent Office 3,508,909
Patented Apr. 28, 1970

3,508,909
TIN SMELTING
Thomas Ronald Albert Davey, Glen Waverley, Victoria, Australia, assignor to Commonwealth Scientific and Industrial Research Organization, East Melbourne, Victoria, Australia, a body corporate
No Drawing. Filed Aug. 28, 1967, Ser. No. 663,549
Claims priority, application Australia, Sept. 2, 1966, 10,581/66
Int. Cl. C22b 25/02, 25/08
U.S. Cl. 75—85                                7 Claims

ABSTRACT OF THE DISCLOSURE

A method of producing tin comprising the step of smelting a tin concentrate, hard-head and flux in a furnace under conditions such that equilibrium is substantially attained to produce high grade tin and high-tin slag and extracting high grade tin from the furnace and retaining the high-tin slag therein; and the further step of adding flux and a carbonaceous reducing agent to the high-tin slag and smelting same in the furnace under conditions such that equilibrium is substantially attained to produce low-tin slag and hard-head and extracting low-tin slag from the furnace and retaining the hard-head therein; and wherein the said steps are alternated to provide a two stage countercurrent process in which the high-tin slag is passed to the said further step and in which the hard-head is passed to the first said step.

---

This invention relates to tin smelting and is particularly concerned with the smelting of low-grade tin concentrates.

Until the eighteenth century, the Roman method of smelting tin ores to metal in a shaft furnace remained basically unaltered as the only method of tin smelting. Then the reverberatory furnace was introduced and eventually replaced the Cornish Castle shaft furnace at about the end of the nineteetnh century when the principle of heat recuperation was adopted following application of it to smelting of steel in reverberatory furnaces.

Tin smelting poses two problems, the simultaneous soluton of which is very difficult except when dealing with high-grade concentrates: to remove the very valuable metal almost completely from the waste slag, and to produce a metal low in iron and preferably low in other impurities also. Because commercial tin concentrates or ores are invariably contaminated with iron minerals, and because the free energies of formation of the lower oxides of tin and iron are very similar, substantially complete reduction of tin from the slag entails reduction of a considerable proportion of iron also.

The ease of production of very high-grade tin concentrates from many large alluvial deposits has tended to determine the world pattern of the tin smelting industry, which, in general, is not well equipped to deal with low-grade concentrates and tariffs for treating these are so unfavourable that mines producing concentrates from difficult lode material must sacrifice recovery considerably to produce a reasonably high grade of concentrate, rather than pay the penalties for a lower grade concentrate which could be produced with higher recovery. Hence, in Australia and Brazil today, tin recoveries of the order of 50–55% are common, whereas some of these deposits could be worked so as to produce higher recoveries of tin in lower grade concentrates. Other deposits probably exist from which high grade concentrates cannot be produced at all but which could become commercially attractive producers of a low grade concentrate if a suitable method for smelting such material were available.

Accordingly, the present invention has as a principal object the provision of a method of smelting better adapted to low-grade concentrate treatment than the existing reverberatory process. However, the present invention is not solely concerned with low-grade tin concentrates but also extends to provide a general process for the smelting of tin concentrates.

In the most commonly used process for smelting tin, tin concentrates, which may have been roasted to remove such harmful impurities as arsenic and sulphur and which may have been leached to remove others such as bismuth and lead, are mixed with limestone and coke or coal and fed to a reduction furnace (shaft or reverberatory) together with return drosses and hard-head (a term which will be explained hereinafter) and are smelted in a first smelt. The products are high-grade tin and a high-tin slag usually containing from 20 to 25% tin. The high-tin slag is removed from the furnace and is either granulated or cast and broken up and is later smelted in a second smelt with a carbonaceous reducing agent and a flux (usually lime) to produce a low-tin slag and a very impure tin known as "hard-head" which is principally comprised of a tin-iron alloy. The slag resulting from the second smelt is disposed of unless it has a high enough tin content to warrant a further smelt and the hard-head is removed from the furnace and subsequently used in the first smelt.

The disadvantages of the above described process are that:

(1) High-tin slag must be extracted from the furnace after the first smelt and later returned thereto for treatment in the second smelt.

(2) Hard-head must be extracted from the furnace after the second smelt and later returned thereto for treatment in the first smelt.

These procedures involve the stockpiling of considerable quantities of both high-tin slag and hard-head and a considerable wastage of energy results from the necessity to reheat these materials subsequently in the various smelts. Stockpiling of high-tin slag means that considerable quantities of tin are not recovered immediately but may be tied up for some weeks or months in the slag. The presently known smelting procedure therefore is to add as much carbonaceous reducing material as possible in the first smelt so as to recover the maximum amount of tin at that stage; the recovery being limited by the permissible limits of contamination by iron which is also produced in the first smelt.

If smelting is carried on until equilibrium is estabilshed between the metal and slag phase, it is possible to predict the results of smelting from the distribution coefficient $k$ which is determined as follows:

$$k = \frac{\text{Sn in metal phase}}{\text{Fe in metal phase}} \times \frac{\text{Fe in slag phase}}{\text{Sn in slag phase}}$$

In our investigations, we have found that the distribution coefficient $k$ is approximately 300 in the first smelt and 50 in the second smelt. Theoretical calculations based on the distribution coefficients obtained indicate that it would be possible to recover 90% of the tin as metal containing 1.3% iron in the first stage from a concentrate containing only 20% tin and 20% iron. This indicated the possibility of carrying out a first smelt involving hard-head and tin concentrate, in the absence of a carbonaceous reducing agent, to recover from such a smelt a very high grade tin metal containing only small amounts of iron.

The present invention provides a method of producing tin comprising smelting a tin concentrate, flux and hard-head in a furnace and subsequently extracting high grade tin therefrom and retaining high-tin slag therein; subsequently adding flux and a carbonaceous reducing agent thereto and continuing the smelting; and subsequently extracting low-tin slag therefrom and retaining hard-head therein; and repeating the above.

Preferably, substantial equilibrium of the metal and slag phases is caused to be attained by provision of suitable stirring or mixing means.

The invention further provides a method of producing tin comprising the step of smelting a tin concentrate, hard-head and a flux in a furnace under conditions such that equilibrium is substantially attained, to produce high grade tin and high-tin slag and extracting high grade tin from the furnace; and the further step of adding flux and a carbonaceous reducing agent to the high-tin slag and smelting same in the furnace under conditions such that equilibrium is substantially attained to produce low-tin slag and hard-head and extracting low-tin slag from the furnace; and wherein the said steps are alternated to provide a two-stage counter-current process in which the high-tin slag is passed to the said further step and in which the hard-head is passed to the first said step.

It is preferred to carry out the above described methods in a rotary furnace which allows rapid attainment of equilibrium between the phases and also allows the individual phases to be easily removed separately from the furnace. Further, when tin concentrates are fed into a rotary furnace containing slag, the tin concentrate particles are enveloped by the slag and thus their tendency to fume is reduced and thus tin fume loss is reduced.

No carbonaceous reducing agent need be added to the furnace during the smelting of the tin concentrate, flux and hard-head, however, if desired, a carbonaceous reducing agent may be added provided that the amount of carbon does not exceed the stoichiometric requirement for the reduction of $Fe_2O_3$ and $SnO_2$ to FeO and SnO. Alternatively, additional hard-head produced from other operations may be added to the furnace during the smelting of the tin concentrate, flux and hard-head, in which case the maximum permissible iron content of such additional hard-head is the stoichiometric requirement for the reduction of $Fe_2O_3$ and $SnO_2$ to FeO and SnO. If desired, both additional hard-head produced from other smelting operations and carbonaceous reducing agent may be added to the furnace during the smelting of the tin concentrate, flux and hard-head provided that the combined amount of carbonaceous reducing agent and the iron content of the additional hard-head does not exceed the stoichiometric requirement for the reduction of $Fe_2O_3$ and $SnO_2$ to FeO and SnO.

The principal reactions involved in the process of this invention may be summarised as follows:

SMELTING OF TIN CONCENTRATE, FLUX AND HARD-HEAD

If No Carbon or Additional Hard-Head Is Added $SnO_2$ + Fe (from hard head) $\longrightarrow$ SnO + FeO
SnO + Fe (from hard head) $\longrightarrow$ Sn + FeO
$Fe_2O_3$ + Fe (from hard head) $\longrightarrow$ 3FeO If Carbon Is Added

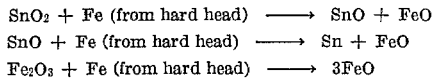
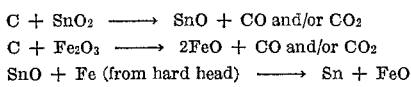

If Additional Hard-Head Is Added

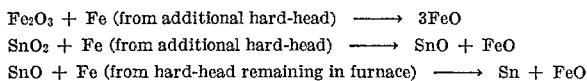

SMELTING OF HIGH-TIN SLAG, FLUX AND CARBONACEOUS REDUCING AGENT

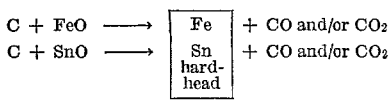

In the method using a rotary furnace, tin concentrate, flux and hard-head are smelted whilst at the same time the furnace is rotated to mix the charge. When the charge is completely molten the furnace rotation is stopped and metal is tapped. Then carbonaceous reducing agent and flux are charged in to the furnace and the smelting and rotation are resumed. When the charge is completely molten again, and the carbon has been consumed, the slag is tapped. Then tin concentrate and flux are charged into the furnace and the smelting is continued.

The above described methods enable the smelting of tin to be carried out at a faster rate than conventional processes and do not require the storage of high-tin slag or hard-head. Further, the methods provide a continuing process and, provided substantial equilibrium is allowed to be attained, a higher percentage yield of tin can be obtained over the conventional process.

It is to be understood that modifications and adaptations may be made to the methods above described without departing from the spirit and scope of this invention which includes every novel feature and combination of features herein described.

I claim:

1. A method of producing tin comprising smelting a tin concentrate, flux and hard-head in a furnace and subsequently extracting high grade tin therefrom and retaining high-tin slag therein; subsequently adding flux and a carbonaceous reducing agent to the furnace and continuing the smelting; and subsequently extracting low-tin slag therefrom and retaining hard-head therein; and repeating the above.

2. A method as claimed in claim 1, wherein substantial equilibrium of the metal and slag phases is allowed to be attained.

3. A method of producing tin comprising the step of smelting a tin concentrate, hard-head and flux in a furnace under conditions such that equilibrium is substantially attained to produce high grade tin and high-tin slag and extracting high grade tin from the furnace and retaining the high-tin slag therein; and the further step of adding flux and a carbonaceous reducing agent to the high-tin slag and smelting same in the furnace under conditions such that equilibrium is substantially attained to produce low-tin slag and hard-head and extracting low-tin slag from the furnace and retaining the hard-head therein; and wherein the said steps are alternated to provide a two stage counter-current process in which the high-tin slag is passed to the said further step and in which the hard-head is passed to the first said step.

4. A method as claimed in claim 3, wherein the method is carried out in a rotary furnace.

5. A method as claimed in claim 3, wherein carbonaceous reducing agent is added to the furnace during the smelting of the tin concentrate, flux and hard-head and wherein the amount of carbonaceous reducing agent added is not in excess of the stoichiometric requirement for the reduction of $Fe_2O_3$ and $SnO_2$ to FeO and SnO.

6. A method as claimed in claim 3 wherein, to the furnace during the smelting of the tin concentrate, flux and hard-head, there is added additional hard-head in an amount such that the iron content of the additional hard-head is not in excess of the stoichiometric requirement for the reaction of $Fe_2O_3$ and $SnO_2$ to FeO and SnO.

7. A method as claimed in claim 3, wherein, to the furnace during the smelting of the tin concentrate, flux and hard-head, there is added carbonaceous reducing agent and additional hard-head in an amount such that the carbonaceous reducing agent and the iron content of the additional hard-head are not in excess of the stoichiometric requirement for the reduction of $Fe_2O_3$ and $SnO_2$ to FeO and SnO.

References Cited

UNITED STATES PATENTS 2,364,815   12/1944   Porter _____ 75—85

L. DEWAYNE RUTLEDGE, Primary Examiner

W. W. STALLARD, Assistant Examiner